United States Patent [19]

Cogliano

[11] Patent Number: 4,936,780
[45] Date of Patent: Jun. 26, 1990

[54] TOUCH SENSOR ALPHA-NUMERIC BLOCKS

[76] Inventor: Mary A. Cogliano, 171 Brickyard Road, Cranbury, N.J. 08512

[21] Appl. No.: 304,179

[22] Filed: Jan. 31, 1989

[51] Int. Cl.$^5$ ............................................. G09B 5/06
[52] U.S. Cl. .................................... 434/311; 434/159; 446/397
[58] Field of Search ............... 434/308, 309, 311, 319, 434/320, 159, 167, 172, 169; 84/476; 446/397

[56] References Cited

U.S. PATENT DOCUMENTS

| | | | |
|---|---|---|---|
| 491,833 | 2/1893 | Bowen | 84/476 |
| 2,315,793 | 4/1943 | Jay | 84/476 |
| 2,879,685 | 3/1959 | Page | 84/476 X |
| 3,087,259 | 4/1963 | Orlick et al. | 434/311 |
| 3,101,556 | 8/1963 | Di Ponfe | 35/35 |
| 3,382,588 | 5/1968 | Serrell et al. | 35/9 |
| 3,460,838 | 8/1969 | Greenlee, Jr. | 369/68 |
| 3,491,461 | 1/1970 | Echterling | 434/311 |
| 3,768,179 | 10/1973 | Woodford et al. | 434/308 |
| 4,651,613 | 3/1987 | Harrison | 84/476 X |

OTHER PUBLICATIONS

"Synthetic Speech from a $50 Teaching Aid", Popular Science, Mar., 1979, p. 153.

Primary Examiner—William H. Grieb
Attorney, Agent, or Firm—Hoffman, Wasson, Fallow & Gitler

[57] ABSTRACT

A series of educational blocks for teaching children the correct sounds of each letter of the English language as well as rudimentry words. Touching or depressing a surface of the block provided with particular indicia thereon would produce a sound corresponding to this indicia. This sound is produced utilizing a solid state memory and an associated speech synthesizer.

6 Claims, 2 Drawing Sheets

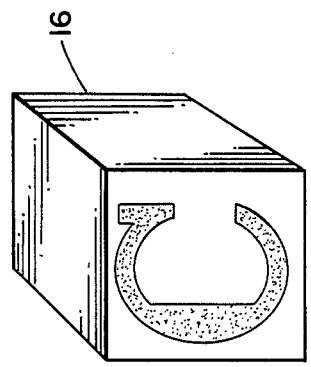
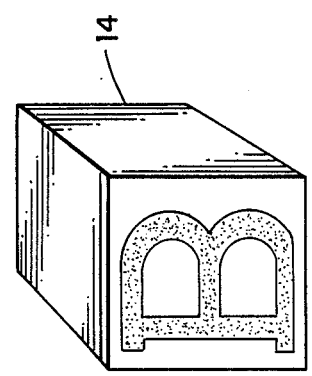
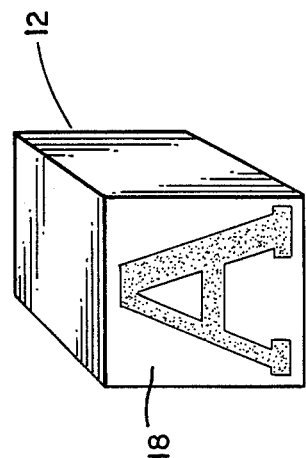
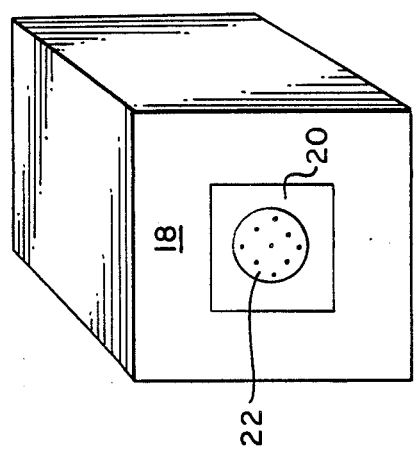
FIG. 1
FIG. 2.

TOUCH SENSOR ALPHA-NUMERIC BLOCKS

BACKGROUND OF THE INVENTION

From time inmemorial, the education of the children in a particular society has been paramount in the minds of the parents and the elders of the society. Due to the increasing complexity of our society, educators have long spent their time devising various methods and devices for better educating our children at an earlier and earlier age. This increasing complexity in our day and age is due in part to the development of new technologies such as printed circuit boards, microprocessors and voice synthesizers used in almost every facet of our daily lives. Since virtually every educator believes that reading is the most important skill to be developed by a child, these educators have endeavored to utilize modern day technology to interest the child in reading as well as to develop the appropriate skills at a relatively early age.

One of the first toys utilized by preschool children to enhance visual as well as manipulative skills is a set of blocks. These blocks have been embossed with various indicia used to interest and stimulate the child. Many of these blocks include a set of alphabet letters which children can use to familiarize themselves with the shape and formation of each letter. Alternatively, these blocks could be used to formulate rudimentry words. While these types of blocks have been utilized to stimulate the children's visual skills, these blocks would provide no benefit relating to the audio skills needed to develop a child's reading ability. While the child can recognize various letters utilizing these types of blocks, he or she would have no clue as to the sound of the individual letters of the alphabet based solely upon utilizing this set of blocks.

Prior art U.S. patents have illustrated various methods of teaching musical notes to children. Typical of these types of devices are shown in U.S. Pat. No. 491,833 issued to Bowen et al; U.S. Pat. No. 2,315,793 issued to Jay and U.S. Pat No. 2,879,685 issued to Page. Various mechanical means such as glass cylinders or vibratory reeds are employed to produce a particular musical tone. Generally, indicia on at least one outside surface of the block would represent the particular musical tone which is being produced.

The idea of including an indicia representing a musical tone has been extended to the English language alphabet in U.S. Pat. No. 3,460,838 to Greenlee, Jr. and U.S. Pat. No. 4,651,613 issued to Harrison. The Greenlee, Jr. patent describes a device for reproducing sound such as letters, words or similar auditory impressions. The interior of the block includes sound grooves as well as a sound pick-up device adapted to engage the sound grooves. When a child pushes down upon the surface of the block, the sound pick-up device engages the sound grooves and a sound is produced. The patent to Harrison although initially directed to a musical block, also illustrates an educational block including a number of sound boxes, each box provided with a shaft cooperating with a key. In use, the key is rotated to actuate each of the sound boxes to annunciate a particular letter or word relating to the indicia applied to the particular surface of the block.

However, due to the rudimentary nature of the methods of producing the letter or word illustrated on the surface of the block, it is quite difficult for the child to obtain a clear impression of the correct pronunciation of the proper sound. Therefore, due to the deficiencies in the prior art, a talking block must be developed which provide the child with the proper pronunciation of the words or letters illustrated on the surface of the blocks.

SUMMARY OF THE INVENTION

The present invention is directed to a talking block which is both inexpensive and could be utilized by a young child with little or no supervision. At least one surface of the block would include a particular indicia thereon and the surface of the block would be constructed from a particularly malleable material. A capacitive or pressure switch is used to activate a voice synthesizer. The synthesizer would be connected to a speaker to produce a sound corresponding to the indicia provided on the surface of the block.

BRIEF DESCRIPTION OF THE DRAWINGS

An understanding of the foregoing and additional aspects of the present invention may be gained from a consideration of the following detailed description and drawings in which:

FIG. 1 is an elevational view of several talking blocks;

FIG. 2 is an elevational view of the interior of one of the talking blocks;

DETAILED DESCRIPTION OF THE DRAWINGS

Figure 3:
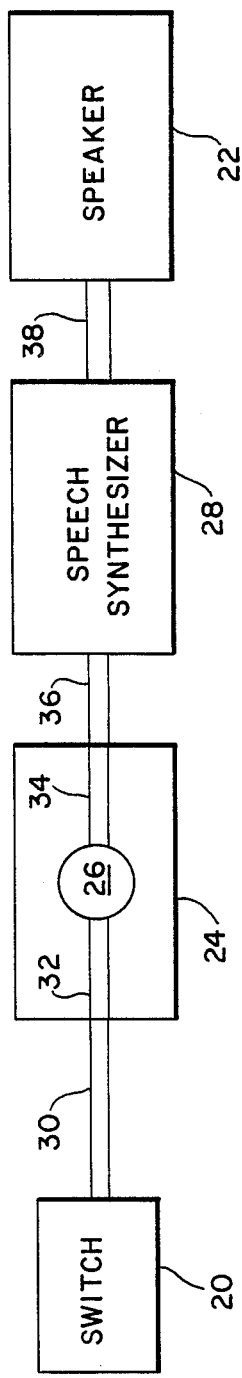
FIG. 3 is a circuit diagram used to produce the sound of each individual block.

As shown with respect to FIGS. 1 and 2, a series of alphabet blocks 10 is shown, each series provided with a plurality of blocks 12, 14 and 16. Each of the blocks includes at least one surface 18 provided with an indicia 20 thereon. The indicia can be embedded into the block, can be applied with paint or other types of applique, as well as embedded in the surface in any conventional manner. Although FIG. 1 illustrates the blocks with indicia applied to only one surface of the block, it is contemplated by the present invention that indicia can be provided to several, or every, surface of the block.

As depicted with respect to FIG. 2, each surface of the block is constructed from a soft, malleable material, such as plastic. A touch reactive capacitive switch 20 can be applied to each surface on the block. Alternatively, the switch 20 can be applied to only a single surface of a block in the situation when indicia is provided on only this single surface. Therefore, when either the one surface or any surface of the block is contacted or manipulated, a sound is produced through speaker 22 which coincides with the indicia 20 applied to the surface 18 of each individual block. It can easily be appreciated that this sound would be representative of the particular letter which is shown on the surface of the block or would correspond to a word, such as dog or cat, which is displayed on the indicia.

The circuitry of the present invention is shown with respect to FIG. 3. The circuit includes a switch 20, a printed circuit board or similar device 24 containing a solid state non-erasable memory 26, such as a read only memory (ROM), a speech synthesizer 28 and the speaker 22. Based upon the circuit, when the switch 20 is activated, a signal is transmitted along conductor 30 to the memory 26 of the printed circuit board 24 along conductive tracing 32. This signal will will be processed and a second signal would be transmitted along tracings 34 to conductor 36 which would thereby produce a digital sound in the speech and sound synthesizer 28. This synthesizer is connected via a conductor 38 to the speaker 22 which would produce a sound representative of the indicia provided on the surface of the block. In this manner, a child playing with the block would become familiarized with the particular letter or word which is represented on the block surface. The printed circuit as well as the speech synthesizer could be included on a single circuit board which is affixed to the interior surface of the block.

Alternatively, switch 20 could be sensitive to the depression of a particular surface of the block and would, in this case, either be provided on the inside surface of the block or provided in the interior of the block at a precise distance from the inside surface of the block. In this situation, the switch is connected via conductor 30 to the printed circuit board which is included in the interior of the block itself. Thereafter, the audio sound would be produced by the speech synthesizer 28 and transmitted to the speaker 22 included on the surface of the block via conductor 38.

Figure 4:
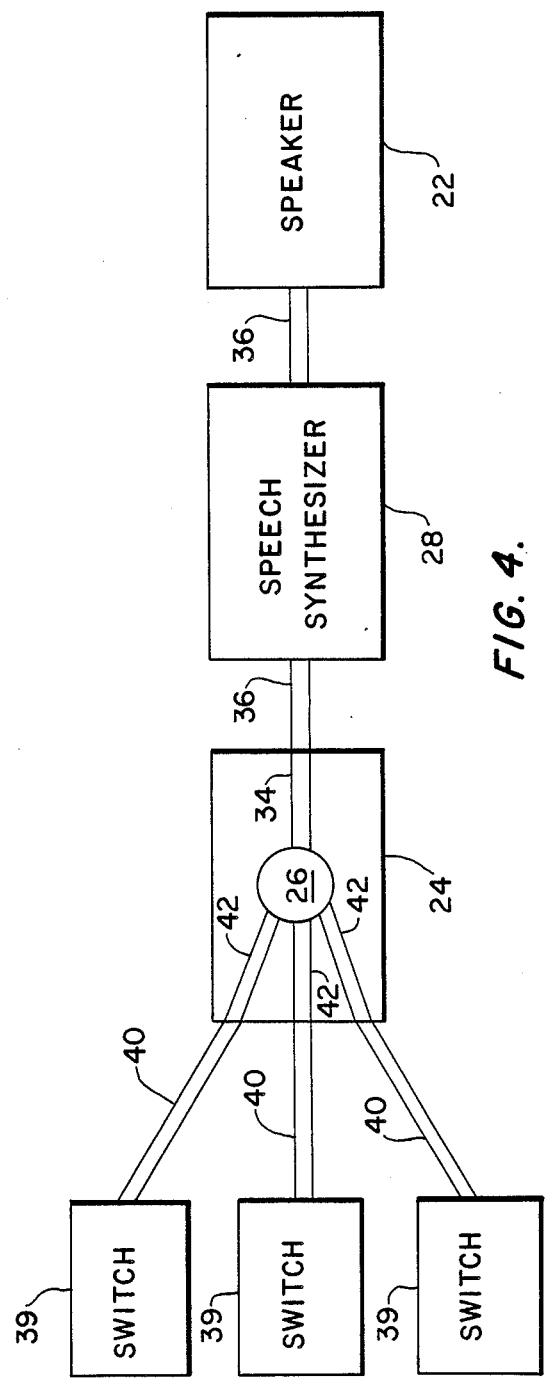
FIG. 4 is a second circuit diagram used to produce the sound of each individual block.

Although the present invention has been illustrated and described in detail, various changes in modifications of this invention are contemplated and can be made therein without departing from the scope of the invention. For example, although the primary embodiment of the present invention illustrates a block in which only a single sound is produced, this need not be the case. Therefore, as shown with respect to FIG. 4, a plurality of separate touch reactive or depression type switches 39 can be applied to or in proximity with each of the surfaces 18 of a block. In this situation, a plurality of conductive wires 40 are connected to the printed circuit board 24. These wires would in turn be connected to separate conductive tracings 42 provided on the printed circuit board, each tracing connected to the memory 26. Consequently, once one of the switches is activated, a special sound coinciding with the indicia provided on the particular surface in which the switch is attached would be produced. It can easily be seen then that each block can produce up to six separate sounds, each sound corresponding to the indicia placed on one of the surfaces of the block. In this situation, only a single speech synthesizer would need to be employed as well as either a single speaker 22 or a plurality of speakers, each speaker attached to one surface of the block.

What is claimed is:

1. A talking block comprising:
   a cube provided with dissimilar indicia on at least two outside surfaces of said cube;
   a plurality of switches connected to each of said outside surfaces provided with indicia, each switch connected to a separate outside surface;
   a solid state printed circuit provided with a non-erasable memory, said printed circuit included in the interior of said cube and connected to each of said switches;
   a speech synthesizer provided in the interior of said cube and connected to said solid state memory; and
   a speaker connected to said speech synthesizer for producing a sound associated with said indicia.

2. The talking block in accordance with claim 1, wherein each of said switches is capacitive.

3. The talking block in accordance with claim 1, wherein each of said switches is pressure sensitive.

4. A series of talking blocks, each talking block comprising:
   a cube provided with dissimilar indicia on at least two outside surfaces of said cube;
   a plurality of switches connected to each of said outside surfaces provided with indicia, each switch connected to a separate outside surface;
   a solid state printed circuit provided with a non-erasable memory, said printed circuit included in the interior of said tube and connected to each of said switches;
   a speech synthesizer provided in the interior of said cube and connected to said solid state memory; and
   a speaker connected to said speech synthesizer for producing a sound associated with said indicia.

5. The talking block in accordance with claim 4, wherein each of said switches is capacitive.

6. The talking block in accordance with claim 4, wherein each of said switches is pressure sensitive.

* * * * *